United States Patent
Wood et al.

(10) Patent No.: US 8,117,525 B2
(45) Date of Patent: Feb. 14, 2012

(54) METHOD FOR PARALLEL DATA INTEGRITY CHECKING OF PCI EXPRESS DEVICES

(75) Inventors: Sam C. Wood, Suwanee, GA (US); Robert J. Caesar, Jr., Berkeley Lake, GA (US)

(73) Assignee: NXP B.V., Eindhoven (NL)

( * ) Notice: Subject to any disclaimer, the term of this patent is extended or adjusted under 35 U.S.C. 154(b) by 420 days.

(21) Appl. No.: 11/917,106

(22) PCT Filed: Jun. 21, 2006

(86) PCT No.: PCT/IB2006/052016
§ 371 (c)(1),
(2), (4) Date: Jul. 14, 2010

(87) PCT Pub. No.: WO2006/137029
PCT Pub. Date: Dec. 28, 2006

(65) Prior Publication Data
US 2011/0004816 A1    Jan. 6, 2011

Related U.S. Application Data

(60) Provisional application No. 60/692,800, filed on Jun. 21, 2005.

(51) Int. Cl.
*G06F 11/10* (2006.01)
*H03M 13/00* (2006.01)

(52) U.S. Cl. ......... 714/807; 714/746; 370/390; 370/469

(58) Field of Classification Search ............... 714/746, 714/751, 752, 758, 807; 370/469, 390
See application file for complete search history.

(56) References Cited

U.S. PATENT DOCUMENTS

| | | | |
|---|---|---|---|
| 6,289,023 B1 | 9/2001 | Dowling et al. | |
| 6,976,205 B1 * | 12/2005 | Ziai et al. | 714/807 |
| 7,269,661 B2 * | 9/2007 | Ree et al. | 709/230 |
| 7,904,779 B2 * | 3/2011 | Belogolovy et al. | 714/751 |
| 2002/0186705 A1 | 12/2002 | Kadambi et al. | |
| 2003/0067916 A1 * | 4/2003 | Deml et al. | 370/390 |
| 2004/0252705 A1 | 12/2004 | Zancan et al. | |
| 2005/0088445 A1 | 4/2005 | Gonzalez et al. | |
| 2005/0108518 A1 | 5/2005 | Pandya | |
| 2006/0274789 A1 * | 12/2006 | Pong | 370/469 |

FOREIGN PATENT DOCUMENTS
CA    2283999 C    3/2000
(Continued)

OTHER PUBLICATIONS

Office Action in Japanese Patent Appln. No. 2008-517686, w/ partial English transln. (Jun. 8, 2010).

(Continued)

*Primary Examiner* — Sam Rizk

(57) ABSTRACT

An apparatus and method for supporting PCI Express is disclosed. A physical layer has a PCI Express interface for receiving data from a PCI Express compatible communication medium. The data is in the form of a packet. A data link layer is disclosed for verifying a CRC value and a sequence number received within the packet. A transaction layer is disclosed for receiving the packet from the data link layer and for processing thereof. The transaction layer processes at least some of the packet data in parallel to the data link layer.

20 Claims, 5 Drawing Sheets

FOREIGN PATENT DOCUMENTS

| | | |
|---|---|---|
| EP | 1 124 362 A2 | 8/2001 |
| JP | 57-083948 A | 5/1982 |
| JP | 06-037852 A | 2/1994 |
| JP | 11-168451 A | 6/1999 |
| JP | 2001-268159 A | 9/2001 |
| WO | 03/069440 A2 | 8/2003 |

OTHER PUBLICATIONS

Office Action in European Patent Appln. No. 06765817.9 (Sep. 15, 2009).

* cited by examiner

METHOD FOR PARALLEL DATA INTEGRITY CHECKING OF PCI EXPRESS DEVICES

The present invention relates to packet transmission on high-speed serial buses, and more particularly to reducing latency of the packet transmission within PCI Express buses.

The peripheral component interconnect (PCI) express bus is a high speed interconnect recently developed for transferring data in computer systems and other electronic devices. Previously existing PCI buses including PCI 2.2 or PCI-X are unable to keep up with the increased I/O bandwidth required by current processors. PCI Express addresses the high demands placed by current software applications such as video-on-demand and audio re-distribution on the platform hardware and the I/O subsystems.

Further, PCI Express differs from previous PCI buses since it is not a single parallel data bus, through which all data is routed at a set rate. Rather, it is an assembly of serial, point-to-point wired, individually clocked 'lanes' each consisting of two pairs of data lines for carrying data upstream and downstream. This 2-way serial connection transmits data in packets. The packets have a pre-defined type and structure, which is documented within the PCI Express 1.0a specification.

The PCI Express architecture further comprises three protocol layers. Within each of these layers, a specified role in processing of PCI Express packets is performed. The three layers consist of transaction layer, data link layer and physical layer. The first layer is a physical layer, wherein the encoding and decoding of symbols to and from serial bit streams is performed. This process is done by pre-pending and appending framing symbols to the packets received from the data link layer. This additional data is used within the physical layer to account for the data transmitted across the serial link.

The second layer comprises the data link layer wherein the higher-level functions and data integrity are handled. Within the data link layer additional information is pre-pended and appended to each packet before transmission thereof and this data is verified upon reception. This information includes a cyclical redundancy check (CRC) and a sequence number. The CRC is for detecting any bit errors that have occurred, and the sequence number indicates the order of packets transmitted to allow for verification that no packets were lost.

In typical PCI Express buses, the sequence number of the packet within the data link layer can be verified upon reception of the first two bytes of the packet header; however, the CRC cannot be checked until the entire packet has been received since all the bytes of the transaction layer packet are used to compute the CRC value. Once the entire packet is received, the calculated CRC is then compared with the CRC present in the packet. If the CRC matches and the sequence number is the next expected sequence number then the packet has been received without error. The packet is then forwarded to the transaction layer for additional verification.

The third layer of the PCI Express architecture comprises the transaction layer. Within the transaction layer, encoding and decoding of packets is performed. Upon reception of packets from the data link layer, additional higher-level checks are performed on the packet itself. These comprise a plurality of checks for valid or allowed packet types, proper traffic class, and proper length encoding. Conventionally, within the transaction layer the packet format is verified before it is forwarded to the host device. In this approach, the entire packet is buffered in order to verify that the actual packet length matches the length encoded in the packet header and that the digest field in the packet header corresponds to a digest at the end of the packet.

One limitation of the above protocol for receiving packets is that each packet is fully buffered within the data link layer to perform CRC checks and fully buffered within the transaction layer to perform length checks. Therefore, the resulting packet latency within the transaction and data link layers described herein is at least twice the time needed to buffer an entire packet. It is further disadvantageous that the approach described hereinabove utilizes two buffers, each having at least sufficient memory for the maximum acceptable packet size for each of the data link and transaction layers, resulting in an increased size and cost of design.

One approach for reducing the latency for packet processing is discussed in Canadian Patent Application CA 2283999A1 by Amagai et al. The packet processing method discussed therein discloses a method for exchanging packet data through a plurality of layers wherein part of each packet relating to the second and third layers is stored within a multi-port shared memory. The multi-port shared memory is then accessed by each of the second and third layers, in a non-interfering manner. Unfortunately, the above method has limitations, which include the complexity and overhead of using a multi-ported RAM.

It would be advantageous to provide a method for receiving and error checking packets within a PCI Express bus supporting reduced latency.

The present invention has been found useful in providing a method of processing packets within a high speed serial interface comprising: receiving the packet at a first layer of a plurality of layers, wherein the first layer comprises a link of the high speed serial interface; processing the packet through the plurality of layers; and, performing error checking of the packet relating to a layer of the plurality of layers in parallel with error checking of the packet relating to another layer of the plurality of layers.

In accordance with the invention there is provided a method of processing packets within a high speed serial interface comprising: receiving the packet at a first layer of a plurality of layers, wherein the first layer comprises a link of the high speed serial interface; during a first period of time, performing error checking of the packet relating to a second layer of the plurality of layers; and, during a second period of time, transferring at least a portion of the packet to a third layer of the plurality of layers, at least a portion of the second period of time overlapping the first period of time.

In accordance with another aspect of the invention there is provided an apparatus comprising: a packet processing apparatus for receiving and transmitting packet data though a plurality of layers comprising: a first packet memory located within a second layer of the plurality of layers for storing at least a first portion of the packet during a first period of time, the least a first portion of the packet smaller than a maximum received packet size; and, a second packet memory located within a third layer of the plurality of layers for storing at least a portion of the packet during a same first period of time.

In accordance with the invention there is provided an apparatus comprising: a physical layer comprising a PCI Express interface for receiving data from a PCI Express compatible communication medium, the data comprising a packet; a data link layer for verifying a CRC and a sequence number within the packet; and a transaction layer for receiving the packet from the data link layer and for processing thereof, the transaction layer for processing at least some of the packet in parallel to the data link layer.

Exemplary embodiments of the invention will now be described in conjunction with the following drawings, in which.

Figure 1:
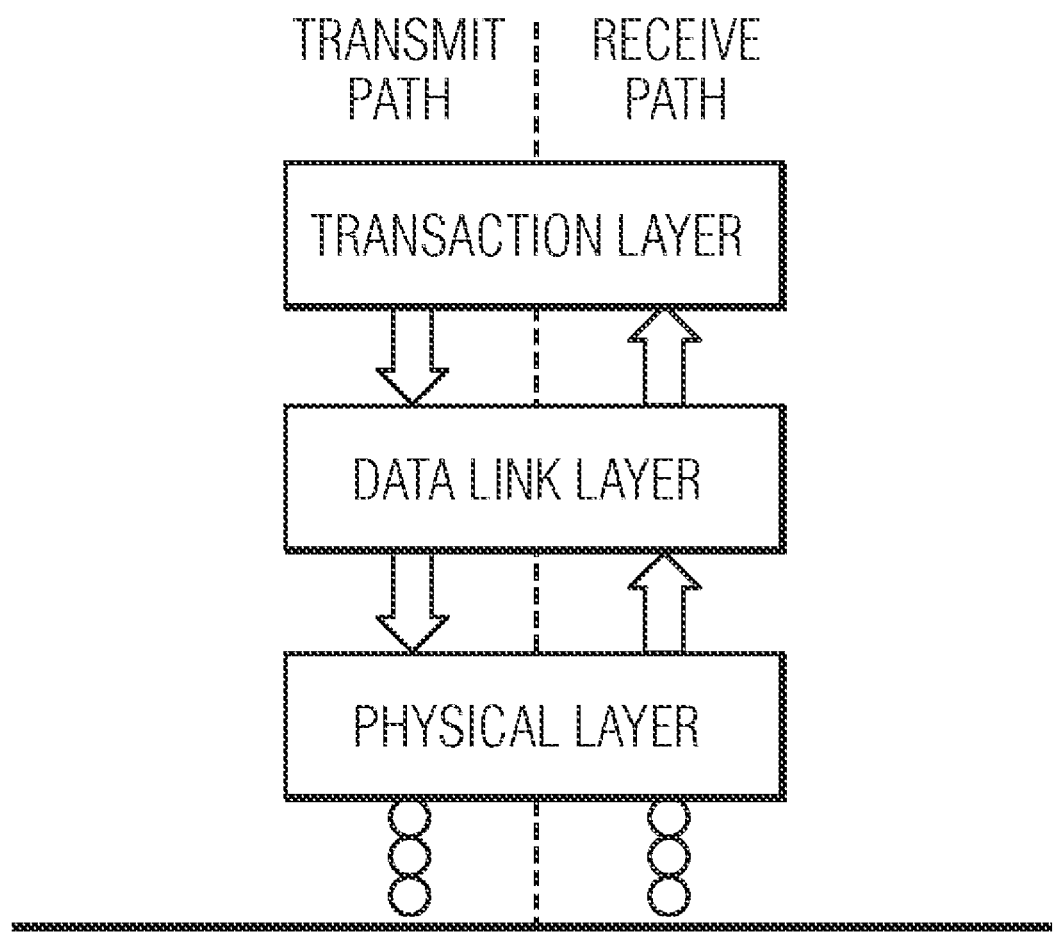
FIG. 1 shows the transmit and receive paths of a packet according to the prior art.

Referring to FIG. 1, shown is a flow diagram of a method for receiving and transmitting a packet between each of the physical, data link and transaction layers. As illustrated in FIG. 1, PCI Express is a bi-directional protocol, containing both transmit and receive data paths. For example, for a receive path, a packet is received from across the PCI Express serial link and passed through the physical, data link and transaction layers. As discussed earlier, within the physical layer the encoding and decoding of symbols to and from serial bit stream is handled while within the data link layer overall data integrity is verified. Further, within the transaction layer the packet is verified and encoding and decoding of the packet is performed before it is delivered to the host device.

Figure 2A:
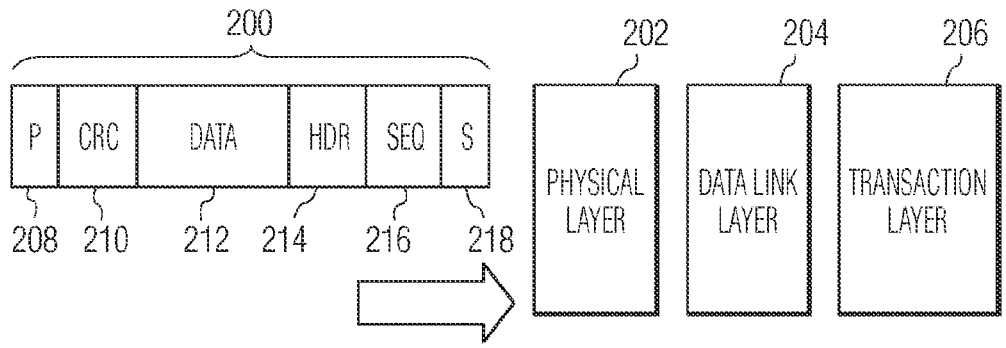
FIGS. 2a is a schematic diagram showing the process of receiving a packet at the physical layer according to the prior art.
Figure 2B:
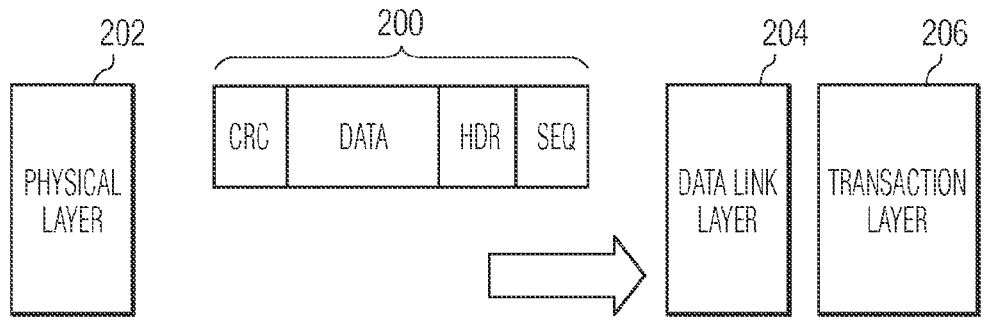
FIG. 2b is a schematic diagram showing the process of receiving a packet at the data link layer according to the prior art.
Figure 2C:
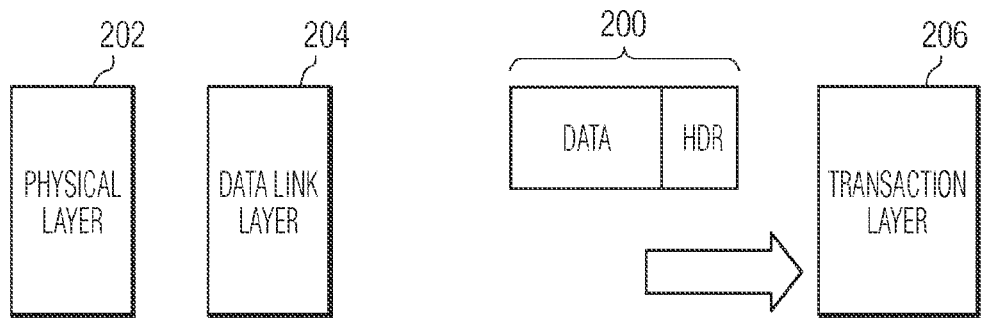
FIG. 2c is a schematic diagram showing the process of receiving a packet at the transaction layer according to the prior art.

Referring to FIGS. 2a, 2b and 2c, shown is a typical prior art process illustrating how a received packet 200 moves through layers of a PCI Express device. As illustrated in these figures, portions of the packet 200 are consumed at each layer along the way to the host device. FIG. 2a shows the packet 200 when received by the physical layer 202. Within the physical layer 202, the start 218 and end packet framing symbols 208 in the incoming data stream are recognised. These framing symbols are removed and the data between the framing symbols is passed up to the data link layer 204 for further processing.

FIG. 2b is a simplified flow diagram of a process where packet information is passed to the data link layer 204. As discussed earlier, within the data link layer 204 overall data integrity is verified by checking that the packet sequence number 216 matches the next expected sequence number and by computing a CRC value from the bytes in the packet header and data sections of the packet. Within the data link layer 204 the packet CRC 210 located at the end of the packet is compared against its computed CRC value to verify data integrity. If the sequence number 216 matches the expected sequence number and the packet's CRC 210 matches the computed CRC, then the sequence number 216 and CRC 210 fields are removed from the packet 200 and the header 214 and data 212 sections of the packet are subsequently transferred to the transaction layer 206 for further processing. FIG. 2c illustrates the process where packet information is received by the transaction layer 206. At this point, within the transaction layer proceeds checks are performed including at least a packet length verification.

Figure 3:
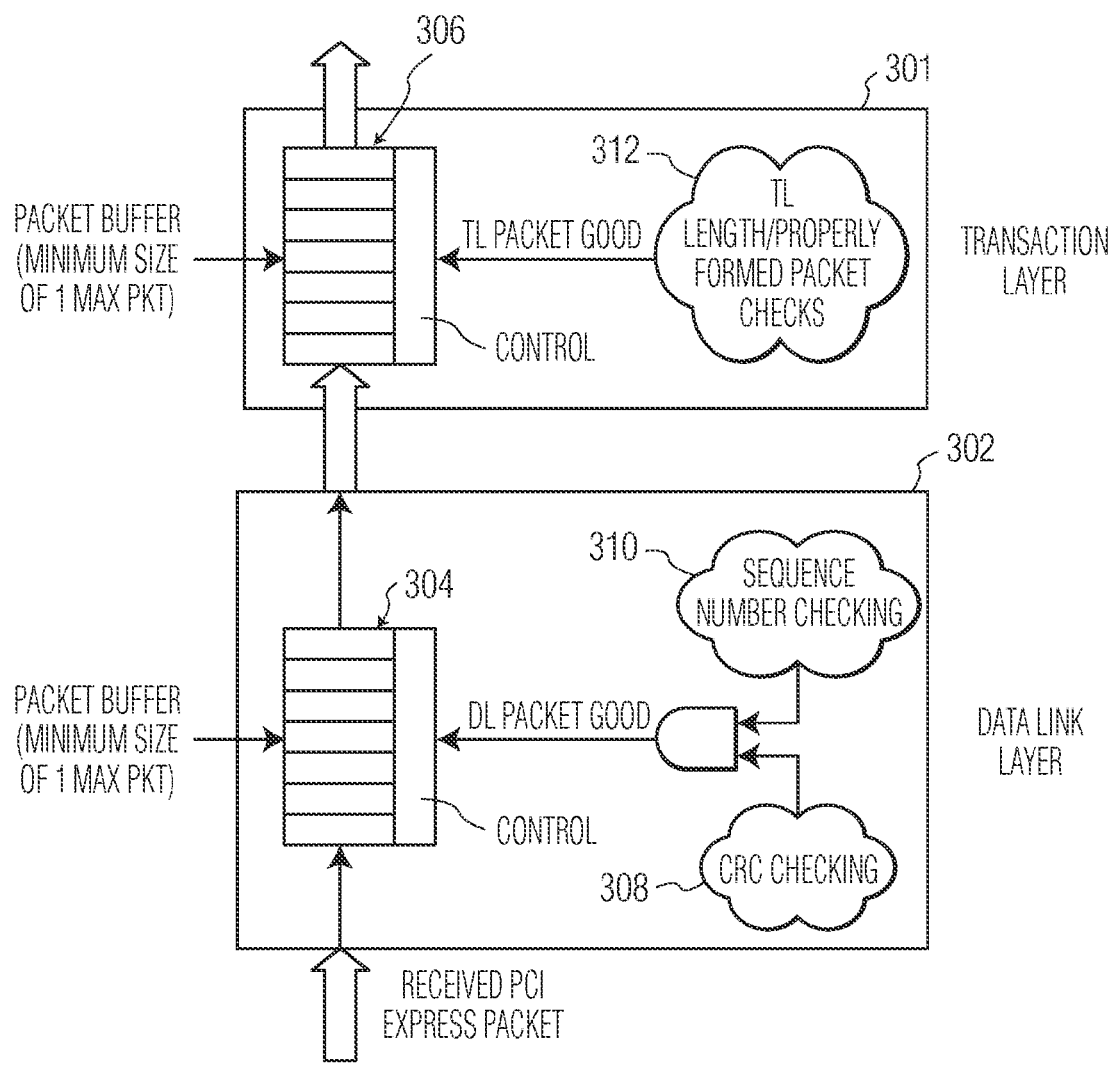
FIG. 3 is a schematic diagram showing a prior art process of packet verification within the transaction layer 301 and data link layer 302 for a PCI Express device.

FIG. 3 shows a prior art process of packet verification and buffering performed within the transaction layer 301 and data link layer 302 for a PCI Express device. As discussed previously with reference to FIGS. 2a-2c, within the transaction layer 301 and the data link layer 302 predetermined packet checks are performed independently; each uses a packet buffer 304 and 306. Here, the size of each buffer is equivalent to at least a maximum sized packet. In addition, all data link layer checks are performed using the buffered packet before this packet is allowed to transfer to the transaction layer 301. This results in a serialization of transaction layer 301 and data link layer 302 checks due to PCI Express rules regarding packet checking within each layer. These rules indicate that packets detected to be corrupt by that data link layer 302 should have no effect on the state or registers related to the transaction layer 301.

Therefore, since each packet is fully buffered within the data link layer 302 to perform CRC checks 308 and fully buffered within the transaction layer 301 to perform at least length checks 312, the resulting packet latency within the transaction and data link layers is at least twice the time required to buffer an entire packet.

It is therefore disadvantageous that in the approach, discussed hereinabove, the layer checks result in buffering for both of the transaction and data link layers for each received packet. This results in a increased packet latency, which increases linearly with the total packet size. For example, in systems without strict real time requirements, this increased latency may be acceptable, but in systems requiring high-speed access to data across a PCI Express link, the latency is preferably minimized. Further, the above approach duplicates a buffer equal to the maximum acceptable packet size in both the data link layer 302 and transaction layer 301. This extra storage increases the size and cost of the design implementation.

Figure 4A:
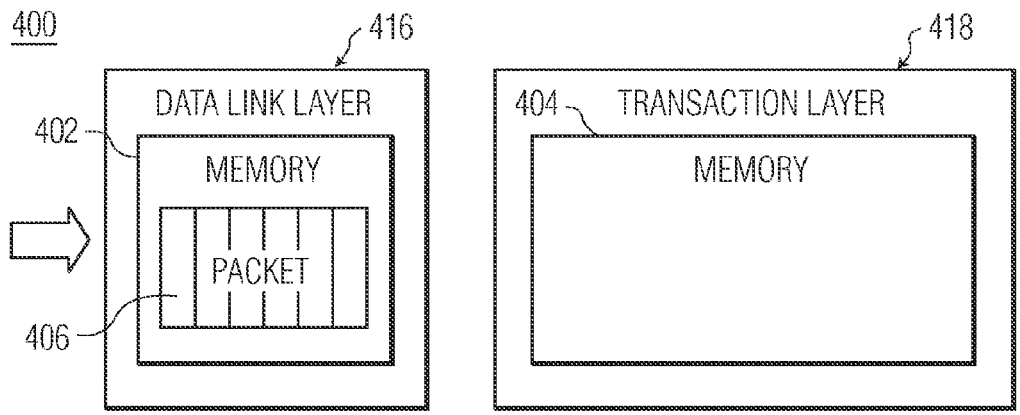
FIG. 4a illustrates the process for packet transmission through the data link layer within a PCI Express according to the prior art.
Figure 4B:
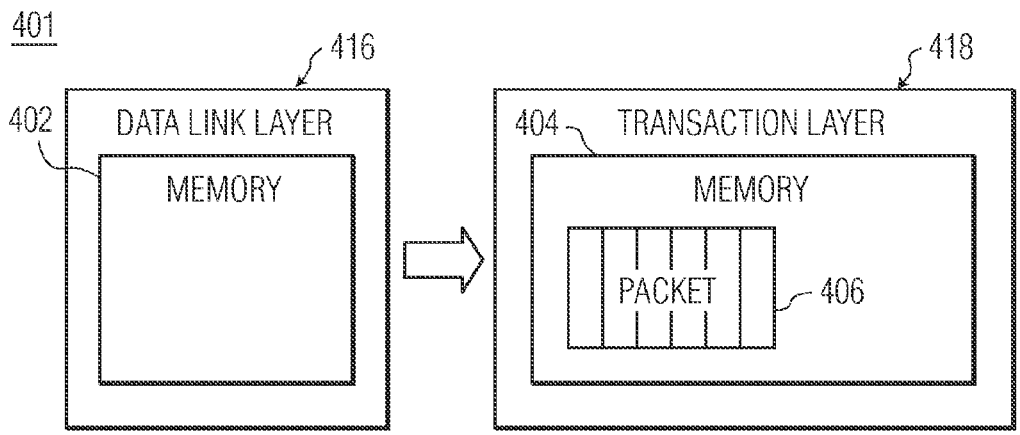
FIG. 4b illustrates the process for packet transmission through the transaction layer within a PCI Express according to the prior art.

FIGS. 4a and 4b illustrate the processes 400 and 401 for packet transmission through the data link 416 and transaction layers 418 within a PCI Express according to the prior art. These figures are consistent with the description of FIG. 3 discussed previously. Referring to FIG. 4a, shown is an incoming packet 406 having its CRC checked, as the packet is stored in the data link layer memory 402. After the CRC is verified, the packet is then transferred to a memory location 404 in the transaction layer 418 as shown in FIG. 4b. In this process, as the packet 406 is received by the transaction layer 418, the contents of the received packet 406 are checked to insure all the fields contain legal values. Therefore the packet is buffered entirely in each of the data link 416 and transaction layers 418 before being passed to the next layer.

Figure 4C:
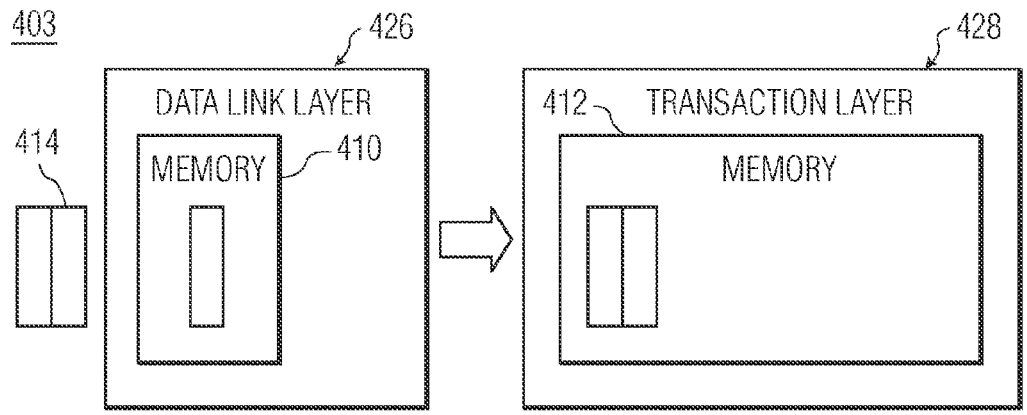
FIG. 4c illustrates the process for packet transmission through the data link and transaction layers within a PCI Express according to an embodiment of the present invention; and, FIG. 5 illustrates a process for parallel data integrity checking according to an embodiment of the present invention.

Referring to FIG. 4c, shown is a process 403 for receiving PCI Express packets according to an embodiment of the present invention. According to the present embodiment, a small portion of a received packet 414 is shown as it passes through a much smaller data link layer memory 410 to the transaction layer memory 412. Thus, the data link layer 426 and the transaction layer 428 packet checks are performed simultaneously without awaiting the completion of the packet checks relating to a previous layer. Further, only a portion of the entire packet is stored in the data link layer 426 memory. According to the present embodiment, the packet checks within FIG. 4c include CRC and sequence number verification as relating to the data link layer 426 and at least packet length verification and a plurality of checks for valid packet types as relating to the transaction layer 428. As will be further illustrated in FIG. 5, by performing the data link layer checks in parallel with the transaction layer checks, this obviates a need for double buffering of each received packet 414 within each of the transaction layer 428 and data link layer 426.

For example, according to the present embodiment, the latency of the received packet 414 is reduced by approximately 50% depending on the underlying architecture. This reduction in latency results in decreased power consumption throughout the entire system. For example, if a processor is waiting on a transaction to complete across a PCI Express Link then the faster response time—reduced latency—allows the processor to return to a lower power state once the transaction completes. The lower power requirements then result in energy cost savings and reduced battery component costs.

Further, the implementation of the present invention uses reduced logic compared to the prior art to perform the equivalent function of the prior art illustrated in FIGS. 4a and 4b. For example, when implementing the present invention within a typical PCI Express core, the approximate improvement is 2-5% reduction in overall area. The net result is cost savings in the form of less silicon area. Also, since less logic is required, fewer manufacturing defects will be present, resulting in a higher IC yield. Further, reduced logic typically requires reduced power to maintain the same functionality.

Figure 5:
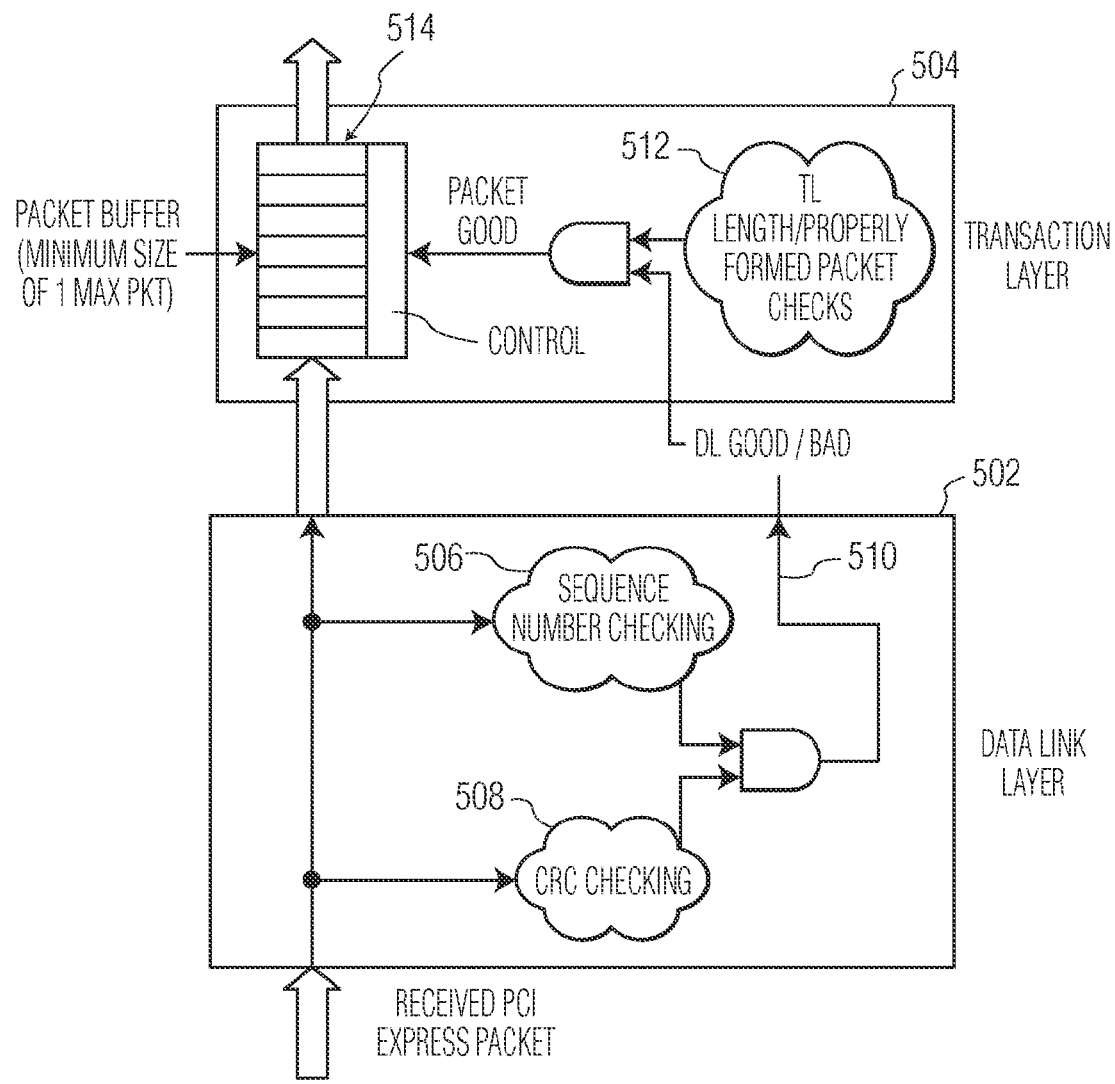

FIG. 5 illustrates a process for parallel data integrity checking according to an embodiment of the present invention, which is consistent with the description of FIG. 4c discussed previously. With reference to FIG. 5, each incoming packet passes through the data link layer 502, without additional latency or buffering, to the transaction layer 504. Within the data link layer 502 all sequence number and CRC checks are performed without delaying the packet transfer to the transaction layer 504. The result is that within the transaction layer 504 the necessary transaction layer packet checks are performed in parallel with the data link layer 502 packet checks.

According to the present embodiment of the invention, the data link layer 502 forwards a status value 510 to the transaction layer 504 once all the data link layer 502 checks are complete. The status value 510 is 'DL Good' dependent upon whether the sequence number of the received packet matches the expected sequence number and whether the computed CRC of the received packet within the data link layer 502 is the same as the CRC field existent within the packet. Conversely, the status value 510 is 'DL Bad' dependent upon at least one of the sequence number of the received packet other than matching the expected sequence number and the computed CRC of the received packet being other than same as a value within the CRC field within the packet. The status value 510 is subsequently forwarded to the transaction layer 504.

This information is then combined with transaction layer 504 checks to control buffer 514 within the transaction layer 504. For example, when at least one of the status value '510' is 'DL Bad' and the plurality of transaction layer checks as defined earlier show an error in the transaction layer packet, such that the packet is determined to be bad by either of the layers 502 or 504, then the packet is discarded.

However, in some cases, a delayed Data Link layer 502 packet checking may allow a potentially corrupt packet to be transferred to the transaction layer 504. Conventional PCI Express specification defines that if a packet is determined to be corrupt by a lower level layer, such as the data link layer, then it must not be additionally detected or logged by a higher level layer, such as the transaction layer. Therefore, according to the present embodiment, a minimal amount of additional logic is added to the transaction layer 504 to ignore any packets having errors detected in other layers. For example, though data checking is performed partially in parallel, when an error is detected, the packet within the transaction layer 504 is cleared and the registers, etc. within that layer are returned to their values prior to receiving the packet. This is achieved by either ensuring that registers do not change until verification from the Data Link layer 502 is received. Alternatively, this is achieved by pushing and popping of register values.

A person of skill in the art will appreciate that the embodiments of the invention described herein clearly support the use of the invention within a plurality of devices that implement a PCI Express link and within a plurality of configurations comprising a Root, Endpoint, Switch, and a Bridge configuration. For example, a PCI Express link can be used within a plurality of applications requiring a relatively high bandwidth connection comprising personal computers, notebook computers, televisions, set-top boxes, satellite receivers, printers, and scanners.

Numerous other embodiments may be envisaged without departing from the spirit or scope of the invention.

What is claimed is:

1. A method of processing packets within a high speed serial interface comprising:
   receiving the packet at a first layer of a plurality of layers, wherein the first layer comprises a link of the high speed serial interface;
   processing the packet through the plurality of layers; and,
   performing error checking of the packet relating to a layer of the plurality of layers in parallel with error checking of the packet relating to another layer of the plurality of layers.

2. A method according to claim 1 wherein the method is compatible with the PCI Express standard.

3. A method according to claim 2, wherein the plurality of layers comprises a physical layer, a data link layer and a transaction layer.

4. A method according to claim 2, wherein error checking of the packet relating to a layer comprises:
   comparing a CRC field of the packet with a computed CRC of the packet;
   comparing a sequence number of the packet with an expected sequence number of the packet; and,
   providing a first status value to the another layer in dependence upon the comparison of the CRC field of the packet and the computed CRC of the packet, and in dependence upon the comparison of the sequence number of the packet and the expected sequence number of the packet.

5. A method according to claim 1, wherein the plurality of layers comprises a physical layer, a data link layer and a transaction layer.

6. A method according to claim 5 wherein the error checking performed in parallel is that of the data link layer and the transaction layer.

7. A method according to claim 6, wherein error checking of the packet relating to a layer comprises:
   comparing a CRC field of the packet with a computed CRC of the packet;
   comparing a sequence number of the packet with an expected sequence number of the packet; and,
   providing a first status value to the another layer in dependence upon the comparison of the CRC field of the packet and the computed CRC of the packet, and in dependence upon the comparison of the sequence number of the packet and the expected sequence number of the packet.

8. A method according to claim 1, wherein error checking of the packet relating to a layer comprises:
   comparing a CRC field of the packet with a computed CRC of the packet;
   comparing a sequence number of the packet with an expected sequence number of the packet; and,
   providing a first status value to the another layer in dependence upon the comparison of the CRC field of the packet and the computed CRC of the packet, and in dependence upon the comparison of the sequence number of the packet and the expected sequence number of the packet.

9. A method according to claim 8 comprising:
   providing a second status value to the another layer in dependence upon performing error checking of the packet relating to the another layer; and,
   discarding the packet when at least one of the first status value and the second status value is indicative of error within the packet.

10. A method according to claim 9 wherein when each of the first status value and the second status value is other than indicative of an error within the packet, transferring the packet to a host device.

11. A method according to claim 8 comprising:
    returning the another layer to its state prior to receiving the packet when the first status value is indicative of an error within the packet.

12. A method according to claim 1, comprising: processing a portion of the packet through a FIFO memory located within the layer prior to transferring at least a portion of the packet to the another layer.

13. A method according to claim 1, absent storing the entire packet simultaneously within the memory of the layer.

14. A method of processing packets within a high speed serial interface comprising:
    receiving the packet at a first layer of a plurality of layers, wherein the first layer comprises a link of the high speed serial interface;
    during a first period of time, performing error checking of the packet relating to a second layer of the plurality of layers; and,
    during a second period of time, transferring at least a portion of the packet to a third layer of the plurality of layers, at least a portion of the second period of time overlapping the first period of time.

15. A method according to claim 14 comprising:
    during a third period of time, performing error checking of the packet relating to the third layer of the plurality of layers, at least a portion of the third period of time overlapping the first period of time and the second period of time.

16. An apparatus comprising:
    a packet processing apparatus for receiving and transmitting packet data though a plurality of layers comprising:
    a first packet memory located within a second layer of the plurality of layers for storing at least a first portion of the packet during a first period of time, the least a first portion of the packet smaller than a maximum received packet size; and,
    a second packet memory located within a third layer of the plurality of layers for storing at least a portion of the packet during a same first period of time.

17. An apparatus comprising:
    a physical layer comprising a PCI Express interface for receiving data from a PCI Express compatible communication medium, the data comprising a packet;
    a data link layer for verifying a CRC and a sequence number within the packet; and
    a transaction layer for receiving the packet from the data link layer and for processing thereof, the transaction layer for processing at least some of the packet in parallel to the data link layer.

18. An apparatus according to claim 17 wherein each of the data link layer and the transaction layer comprise memory storage locations, memory storage locations within the data link layer for storing a portion of a packet less than the whole received thereby.

19. An apparatus according to claim 17, comprising a communication circuit for communicating between the data link layer and the transaction layer data that is indicative of a validity of the present packet.

20. An apparatus according to claim 17, wherein the transaction layer comprises circuitry for returning the transaction layer to a state of the transaction layer prior to processing of the present packet upon receipt of a signal from the data link layer that the present packet is invalid.

* * * * *